United States Patent [19]

Alexander

[11] 4,213,021
[45] Jul. 15, 1980

[54] INDICATING CHECK VALVE

[75] Inventor: Richard M. Alexander, Jackson, Mich.

[73] Assignee: Aeroquip Corporation, Jackson, Mich.

[21] Appl. No.: 4,698

[22] Filed: Jan. 19, 1979

Related U.S. Application Data

[63] Continuation-in-part of Ser. No. 935,529, Aug. 15, 1978, abandoned.

[51] Int. Cl.² ............................................. H01H 35/38
[52] U.S. Cl. .......................... 200/81.9 M; 200/82 E; 137/540
[58] Field of Search ................. 137/469, 540, 554; 116/267; 73/228; 340/606, 611, 626; 200/82 R, 82 E, 81.9 M

[56] References Cited

U.S. PATENT DOCUMENTS

| | | | |
|---|---|---|---|
| 2,930,401 | 3/1960 | Cowan | 137/540 |
| 2,959,188 | 11/1960 | Kepner | 137/540 |
| 3,327,079 | 6/1967 | Widl | 200/82 E |
| 3,580,275 | 5/1971 | Hanson | 137/540 |
| 3,766,779 | 10/1973 | Hoffman | 200/82 E |
| 3,945,396 | 3/1976 | Hengesbach | 137/496 |
| 4,071,725 | 1/1978 | Smith | 200/82 E |

*Primary Examiner*—Gerald P. Tolin
*Attorney, Agent, or Firm*—Collins, Oberlin & Darr

[57] ABSTRACT

A valve apparatus having a poppet valve carrying a magnet and a switch responsive to movements of the magnet wherein the switch is activated and deactivated by movement of the magnet into and out of proximity with the switch. The spring biased poppet valve is movable from a closed position under the influence of a predetermined fluid flow rate in one direction to an open, switch activating position and then is returned upon a slight reduction in fluid flow in the opposite direction past the switch activating position to a switch deactivating position intermediate the latter and the valve closed position. The valve is formed with a specially configured nose portion to provide poppet valve travel at predetermined fluid flow rates to activate and deactivate the switch.

5 Claims, 6 Drawing Figures

INDICATING CHECK VALVE

CROSS REFERENCE TO RELATED APPLICATIONS

This is a continuation-in-part of applicant's prior co-pending application Ser. No. 935,529, filed on Aug. 15, 1978, now abandoned.

BACKGROUND OF THE INVENTION

1. Field of the Invention

This invention generally relates to indicating check valves, and more particularly to indicating check valves including a switch responsive to movements of a magnet carried by a movable valve member.

2. Description of the Prior Art

While the invention has features that make it applicable for many purposes in various fields, the present disclosure is directed to detecting a slight reduction below the desired rate of fluid flowing through a piping system. For example, it may be desirable to activate a signal when a desired rate of fluid is flowing through the piping system and a warning signal when a dangerously low rate of fluid is flowing therethrough, or it may be desirable to activate or deactivate a flow indicator. Such functions generally require energizing an external electrical circuit. Of course, monitoring devices having externally located switches responsive to moving elements located within a piping system are known.

Such monitoring devices generally incorporate a magnetically responsive switch for monitoring fluids flowing therethrough such as shown, for example, in U.S. Pat. Nos. 3,549,837 and 3,549,839, each issued on Dec. 22, 1970. In these patent disclosures, a magnet is moved, by the pressure of fluid moving in the conduit, into and out of proximity with a switch externally isolated from the fluid flow and which is responsive to movement of the magnet.

However, no prior art monitoring device is known which will accurately sense or determine the rate of fluid flowing at thresholds initially activating a switch and then deactivating the switch when the rate of the flowing fluid drops slightly below the fluid flow rate initially activating the switch. While such known devices are operative to activate and deactivate the switch, they are not entirely satisfactory because they permit relatively large and indeterminate flow rates of fluid between the instances of switch activation and deactivation. It would be desirable to activate and deactivate the switch with very little difference in fluid flow rates and to be able to determine or sense the specific flow rates that activate or deactivate the switch in order to indicate a normal operating condition or an abnormal condition, respectively. One of the most serious problems confronting such a monitoring device is to control its operation so that a switch is activated at the precise instant when a desired minimum rate of fluid begins to flow through the piping system and deactivated at the precise instant when the rate of fluid flowing through the piping system begins to drop or drops below a predetermined level.

SUMMARY OF THE INVENTION

Briefly, in practicing this invention, a poppet valve included in an indicating check valve assembly carries a magnet into and out of proximity with an isolated, magnetically responsive switch for activating and deactivating it. The poppet valve is moved from a normally closed position to an open position by fluid pressure acting against a biasing force urging the poppet valve toward its closed position and resulting in a predetermined rate of fluid flowing through the valve assembly. The linear movement of the poppet valve is correlated with the rate of fluid flowing through the valve assembly so that the exact quantity of fluid flowing at the instant the switch will be first activated can be determined. When the poppet valve moves toward its normally closed position it will pass through an intermediate position between the valve closed position and the valve open position, moving the magnet out of proximity with the switch and causing its deactivation. The return linear movement of the poppet valve is also correlated with the rate of fluid flowing through the valve assembly so that the exact quantity of fluid flowing at the instant the switch is deactivated can be determined. The correlation of the linear movements of the poppet valve with the quantity of fluid flowing at precise instants is accomplished by providing the poppet valve with a projecting nose profile having a relationship of stepped diameters and linear dimensions, and relating the movement of the magnet carried by the poppet valve into and out of proximity with the associated magnetically responsive switch.

OBJECTS AND ADVANTAGES

An object of this invention is to provide a novel indicating check valve wherein a poppet valve moves from a normally seated position to an open position under pressure of fluid flowing therethrough, wherein it passes through a switch activating position as it moves toward the open position and a switch deactivating position as it returns toward its normally seated position.

Another object of this invention is to provide an indicating check valve sensing the quantity of fluid flowing therethrough at the precise instant a switch is activated and at the precise instant the switch is deactivated.

Yet another object of this invention is to provide an indicating check valve having an associated switch activated and deactivated in response to linear movements of a poppet valve carrying a magnet and passing through positions proximate the associated switch.

Yet another object of the invention is to provide a novel indicating check valve of the poppet valve type that is simple in construction, economical to manufacture, efficient in operation and positive in action for moving the poppet valve through prescribed positions under predetermined pressures of fluid flowing therethrough for activating and deactivating an associated external switch.

Other objects and advantages will become more apparent during the course of the following description, when taken in connection with the accompanying drawings.

BRIEF DESCRIPTION OF THE DRAWINGS

In the drawings, wherein like numbers are employed to designate like parts throughout the same.

DESCRIPTION OF THE PREFERRED EMBODIMENT

Figure 1:
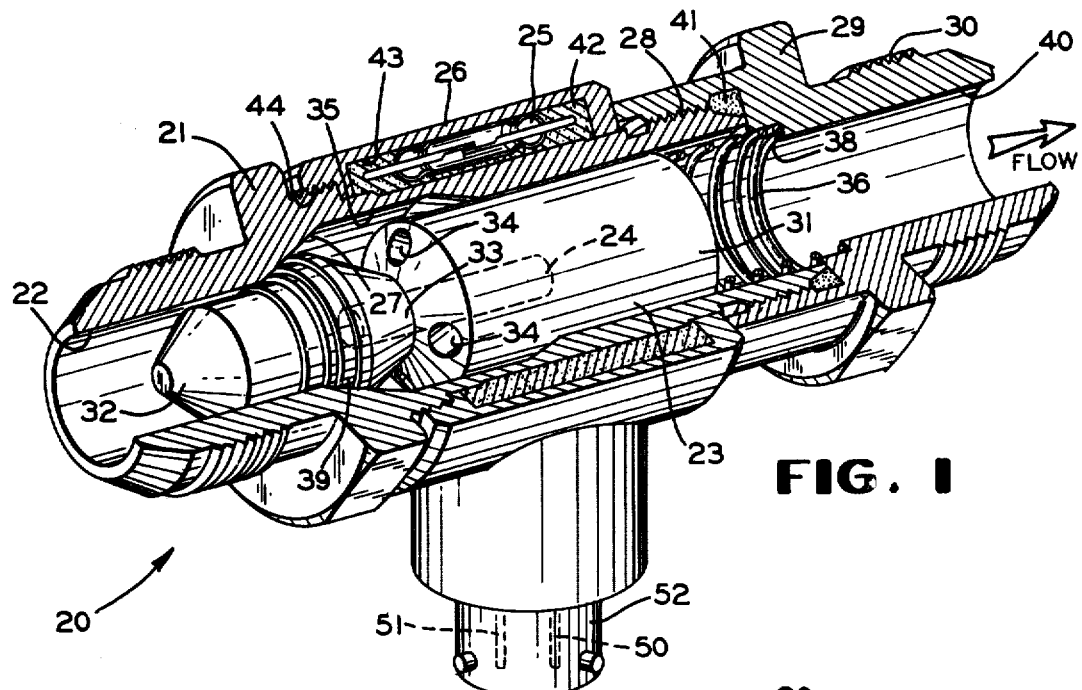
FIG. 1 is a perspective view, partly in section, of an indicating check valve constructed in accordance with the invention.

Referring now to the drawings, particularly to FIG. 1, there is illustrated an indicating check valve constructed in accordance with the invention and designated in its entirety by the reference numeral 20. Briefly, and as there shown, the check valve 20 includes a female valve body 21 having a bore 22 extending therethrough, which valve body is adapted to be connected to the pump side of a fluid piping system (not shown); a normally seated male poppet valve 23 movable therein; a magnet 24 carried by the poppet valve 23 and an associated switch 25 which is activated and deactivated by the magnet 24 and which is externally located from the bore 22 in a housing 26 surrounding the female valve body 21.

The valve body 21 is generally cylindrical in form, and one end of the bore 22 therein serves as an inlet port adjacent which is a conically-shaped valve seat 27. The opposite end of the bore 22 is open for slidably receiving the poppet valve 23. The exterior surface defining this open end of the bore 22 is provided with an externally threaded portion 28 for connection to an internally threaded end of an adaptor coupling 29. The exterior surface of the adaptor coupling 29 is provided with an externally threaded portion 30 for connection to the opposed end of the prior mentioned piping system.

The male poppet valve 23, also of cylindrical form, is provided with a barrel portion 31 which is slidably received in the open end of the bore 22 for reciprocal movement. The pressure side of the poppet valve 23 is provided with an axially protruding nose portion 32 integrally attached at an end of the barrel portion 31 by a reduced neck portion 33. The neck portion 33 is provided with a plurality of circumferentially spaced apertures 34 for the passage of fluid which flows from the inlet port, around the valve nose 32, into an enlarged chamber 35 provided in the bore 22 of the valve body 21, and then into the interior of the barrel portion 31. It should be noted that the nose 32 of the poppet valve 23 extends into the inlet port; the function and profile of which will be described in detail hereinafter.

A compression spring 36, received within the barrel portion 31 of the poppet valve 23, acts between a shoulder 37 formed in the poppet valve 23 and a shoulder 38 provided in the adaptor coupling 29 for yieldably urging an O-ring 39 retained in a groove provided in the nose portion 32 into seating engagement with the valve seat 27. The adaptor coupling 29 is provided with a bore 40 which serves as an outlet port for the check valve assembly. A packing 41 is disposed in a space defined between the end of the valve body 21 and the adaptor 29 for sealing the threaded connection therebetween.

As previously mentioned, the magnet 24 is carried by the poppet valve 23 for movement therewith. To this end, the face of the nose portion 32 opposite the inlet port is proivded with an aperture for receiving one end of the magnet 24 with a tight friction fit. Preferably, the magnet 24 is in the form of a cylindrical rod projecting from nose portion 32 and extending rearwardly into the interior of the barrel portion 31.

The switch 25 is a magnetically responsive reed switch and is positioned in operative association with the magnet 24 on the exterior surface of the valve body 21. More specifically, the switch 25 is mounted in a compound 42 contained withinn a cavity 43 defined in the cylindrical housing 26 which is threadedly attached, as at 44, at one of its ends to the valve body 21. Accordingly, it should be noted that the position of the switch 25 relative to the magnet 24 is axially adjustable on the valve body 21. As is known in the art and best shown in FIGS. 4 through 6, the reed switch 25 has an evacuated and sealed glass envelope 45 with metallic contacts 46 and 47 mounted on normally spaced-apart strips 48 and 49, respectively, which normally constitutes an electrical signal output element of the switch 25. The magnetic susceptibility of one of the spring strips 48 or 49 is such that an influencing magnetic field of sufficient strength overcomes the biasing force of the one spring strip and causes the contacts 46 and 47 to close to complete an electrical circuit. Leads (not shown) interconnect the contacts 46 and 47 with terminals 50 and 51 of an electrical connector 52 (see FIG. 1) for connection to a desirable electrical circuit (not shown). For example, the terminals 50 and 51 may be interconnected to an electrical circuit including indicating lamps.

Figure 2:
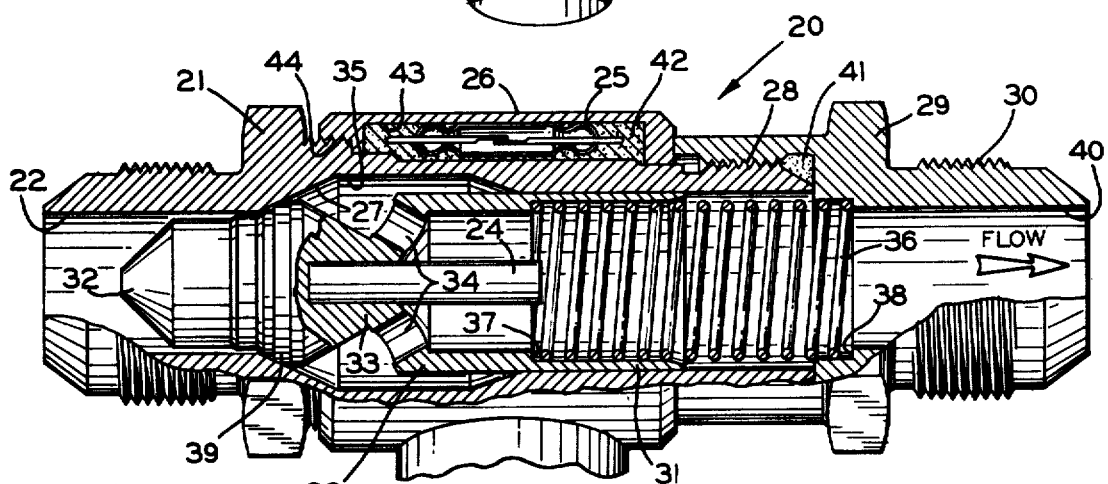
FIG. 2 is an elevational section view, illustrating the relationship of the valve and switch elements when the poppet valve is in its seated position.
Figure 3:
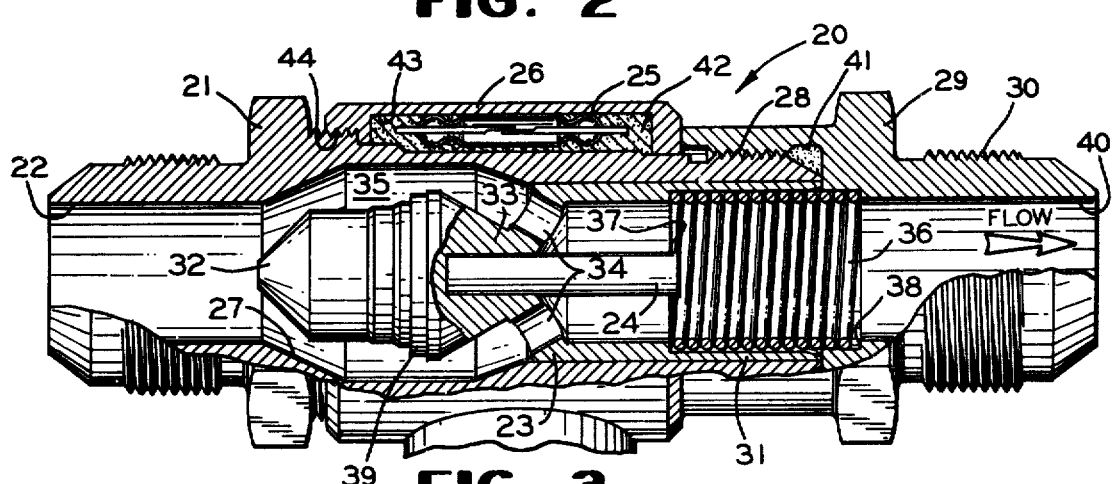
FIG. 3 is a sectional view similar to FIG. 2, but illustrating the relationship of the valve and switch elements when the poppet valve is in an open position.

Referring now particularly to FIG. 2, it should be noted that when the poppet valve 23 is seated to close the inlet port, the relative position of the magnet 24 to the reed switch 25 is such that contacts 46 and 47 of the switch are in an open position. When poppet valve 23 is moved toward the outlet port, to the right as viewed in FIGS. 2 and 3, under the influence of fluid flowing under pressure in the inlet port, the consequent movement of magnet 24 and its associated magnetic field therewith will effect closing of contacts 46 and 47 when reaching a predetermined position or proximity relative to the switch, as illustrated in FIG. 3.

As previously mentioned, the use of movable magnets to close and open magnetically responsive reed switches is well known and their utility in fluid flow systems also is known. Further, it should be appreciated that the problem encountered heretofore in such switch arrangements in known fluid flow systems has been that while switch closing and opening was indirectly responsive to differential flow rates, the degree or extent of the fluid flow rates establishing these "closed-open" positions could not be accurately determined because of the effect of magnetic hysteresis on the switch. This means, as applied to a reed switch, that after the switch has been closed by a predetermined position or proximity of the magnet relative thereto upon magnet movement in one direction, the magnet upon movement in the opposite direction must be returned to a position past such predetermined position to effect opening of the switch. This is occasioned by the lag or "hysteresis effect" of the magnet on the switch due to the changing magnetic force caused by the moving magnet. Thus, a magnet must have sufficient travel in one direction before activating the switch in order to accommodate the greater return travel required to deactivate the switch. In providing such travel, conventional poppet valves carrying magnets allowed relatively large indeterminate fluid flow rates.

Figure 5:
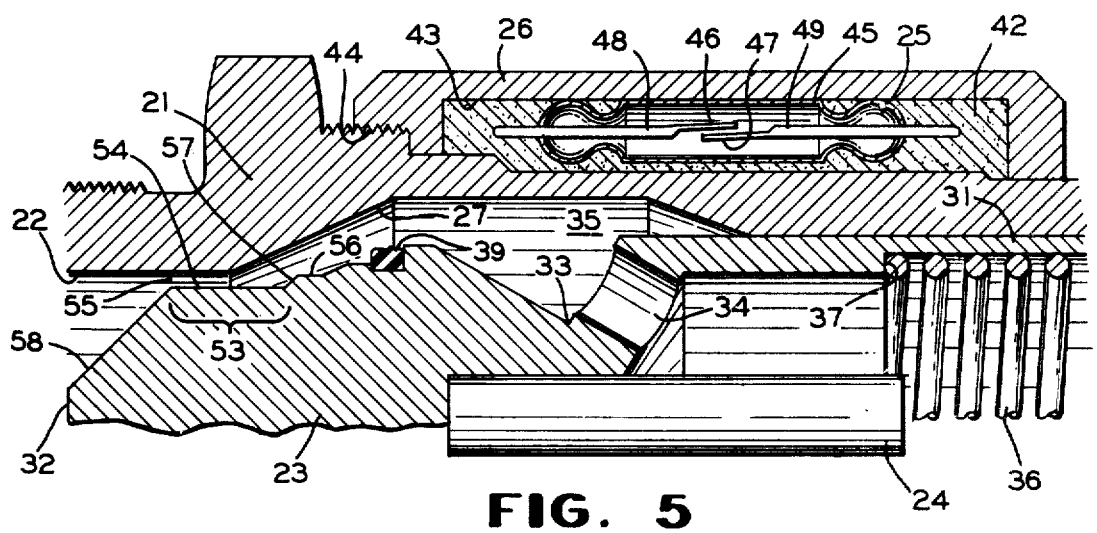
FIG. 5 is a view similar to FIG. 4, but illustrating the poppet valve in a slightly open position at the instant fluid begins to flow through the check valve with the switch contacts still open.
Figure 6:
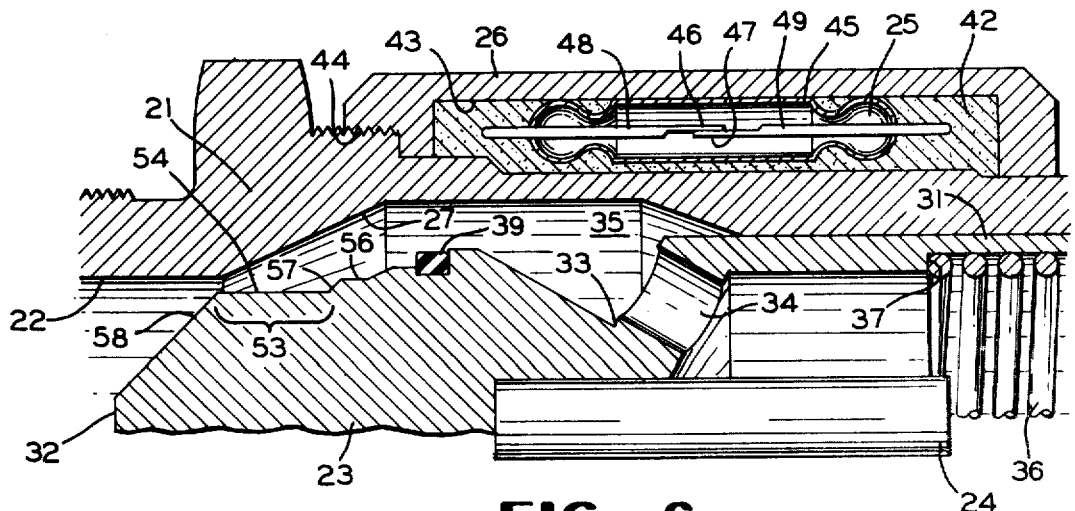
FIG. 6 is a view similar to FIGS. 4 and 5, but illustrating the poppet valve at an intermediate position at the instant the magnet is moved into proximity with the switch closing its contacts.

Accordingly, a significant feature of this invention lies in the design of the nose portion of the poppet valve 23 which provides for sufficient travel of the poppet valve 23 from its closed position to its open position in order to close the switch contacts 46 and 47 as illustrated in FIG. 6, while allowing for the greater return travel required by the poppet valve 23 when returning towards its closed position so as to open the switch contacts 46 and 47. This novel nose design of the poppet valve also provides for establishment of a predetermined fluid flow rate through the valve 20 at the instant the switch contacts close (see FIG. 6) and a slightly less, predetermined reduction in the fluid flow rate at the instant the switch contacts 46 and 47 open (see FIG. 5).

It was found that the necessary valve travel between activation and deactivation of the switch to allow for the hysteresis effect could be accommodated with substantially the same or slightly different fluid flow rates by forming the nose portion 32 as an axial protrusion having a desired length 53. By correlating the length 53 of the protrusion with the travel required by the poppet valve 23, the poppet valve 23 moves from a slightly open position to a full open position at a predetermined fluid flow rate closing the switch contacts 46 and 47 as illustrated in FIG. 3. However, while the length of the nose produces the required valve travel to activate and deactivate the switch, it alone lacks the capability of determining or ascertaining the fluid flow rate at which the valve travels.

Figure 4:
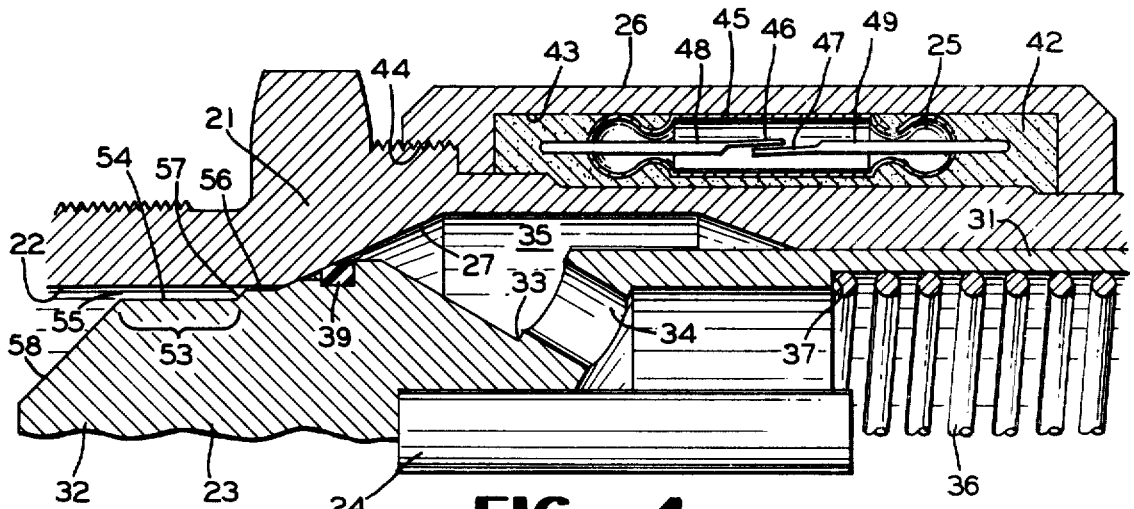
FIG. 4 is an enlarged, fragmentary sectional view, illustrating the relationship of the poppet valve in a closed position with the magnet out of proximity with the switch having its contacts open.

Accordingly, the nose portion 32 of the poppet valve 23 of this invention has been further specially configured to provide a stepped profile which, in addition to producing the valve travel, also determines the fluid flow rate at which the poppet valve 23 moves to a fully open position at which position the switch contacts 46 and 47 are closed, and to the closed position where the switch contacts are open. To this end, and as best shown in FIGS. 4 through 6, the protrusion of the nose 32 includes a elongated cylindrical portion 54 of reduced diameter projecting into the bore 22 serving as the inlet port of the valve body 21. The diameter of the cylindrical portion 54 is correlated with the volume of the predetermined fluid flow which moves the poppet valve 23 to its open position so that only a slight reduction in the volume of the fluid flow allows the poppet valve 23 to travel a sufficient distance toward the inlet port and deactivate the switch contacts 46 and 47. It should be noted that the diameter of the cylindrical portion 54 can be sized to determine different flow rates. Accordingly, when fluid first begins to flow into the valve 20, the pressure thereof acting on novel nose 32 initially moves the poppet valve 23 to a slightly open position, as illustrated in FIG. 5, and an annular passage 55 is defined between the surfaces of the bore 22 and the periphery of the cylindrical portion 54. The annular passage 55 does not have sufficient area for the volume of fluid to flow therethrough at the predetermined full flow rate, and accordingly, the poppet valve must be further retracted to move the nose 32 out of the way. The required amount of poppet valve travel to its open position then, is determined by the pressure providing a predetermined fluid flow.

At this point, it should be noted that the step 56 adjacent the cylindrical portion 54 on the nose 32 also functions to guide the poppet valve 23 into its closed position. Although the step 56 determines the valve travel at low fluid flow rates, it is not of importance in activating and deactivating the switch contacts 46 and 47 at the predetermined fluid flow rates.

Referring now particularly to FIG. 4, it will be noted that when fluid is not flowing through the check valve 20 or, in other words, when the pressure of the fluid acting on the poppet valve 23 is less than the biasing force of the spring 36, the poppet valve 23 will be in a closed or seated position. Also, it will be noted that when the valve 23 is in the closed position, the elongated portion 54 and the step 56 lie within the bore 22 and present a pair of surfaces 57 and 58 against which the pressure of the fluid acts.

When the pressure of the fluid initially acting against the surfaces 57 and 58 of the poppet valve 23 builds up to a level to overcome the biasing force of the spring 36, the valve 23 will move to the slightly open position, towards the outlet port as illustrated in FIG. 5. At this point it should be noted that the valve remains relatively stationary as fluid flow rate increases until the predetermined flow rate is obtained at which time the valve 23 moves from the slightly open position to its fully open position activating the switch. Accordingly, the required amount of poppet valve travel is obtained without a significant change in the flow rate of the fluid. When there is a slight reduction in the rate of fluid flow, the drop of pressure acting against the poppet valve 23 allows the valve to move towards the inlet port to the slightly open position, and the magnet 24 will deactivate the switch 25 (in this case open the contacts 46 and 47 thereof as illustrated in FIG. 5).

In summary, as fluid enters the bore 22 of the indicating check valve 20, the poppet valve 23 moves to a slightly open position, remaining in this position until the desired fluid flow rate is obtained. At this desired fluid flow rate, the poppet valve 23 travels to its full open position, thus moving the magnet 24 into proximity with the switch 25 closing its contacts. When there is a slight reduction in the fluid flow rate, the poppet valve 23 will return to the slightly open position moving the magnet 24 out of proximity with the switch 25 (see FIG. 5) thus opening the switch contacts 46 and 47.

From the foregoing discussion and as best illustrated in FIGS. 4 through 6, it is seen that the novel nose portion 32 includes an elongated cylindrical portion 54 having a length correlated with the travel required of the poppet valve 23 to activate the switch 25 at a predetermined fluid flow rate. More specifically, the relationship of the linear length 53 of the elongated portion 54 along with the diameter thereof and their disposition on the nose 32, allows for the calibration of two predetermined fluid flow rates with only a slight reduction therebetween. Further it has been found that the indicating check valve 20 will only indicate two separate flow rates when the larger of the two flow rates is indicated first. Accordingly, it can readily be seen that the indicating check valve constructed in accordance with the invention will activate and deactivate a magnetically responsive switch at two different predetermined flow rates of fluid flowing through the valve and that only a slight difference between the flow rates is required.

It is to be understood that the form of the invention herewith shown and described is to be taken as an illustrative embodiment only of the same, and that various changes in the shape, size and arrangement of the parts may be resorted to without departing from the spirit of the invention.

I claim:

1. An indicating check valve comprising:
   a. a valve body having a bore extending therethrough with inlet and outlet ports for the passage of fluid flowing under pressure;
   b. a poppet valve having a pressure side adjacent said inlet port and disposed within said valve body for movement in said bore for opening and closing said inlet port;
   c. a magnet carried by said poppet valve on the side opposite said pressure side for movement therewith;
   d. switch means associated with said valve body and responsive to movements of said magnet carried by said poppet valve;
   e. biasing means disposed within said valve body for urging said poppet valve to a position closing said inlet port; and
   f. an elongated cylindrical nose portion disposed on the pressure side of said poppet valve and extending into said inlet port, said nose portion including a reduced diameter cylindrical portion for correlating the travel of said poppet valve away from said inlet port by a first predetermined fluid flow rate and toward said inlet port by a reduced predetermined fluid flow rate whereby said first predetermined fluid flow rate activates said switch means when said poppet valve is in an open position, and said reduced predetermined fluid flow rate permits said poppet valve to return toward said inlet port deactivating said switch means.

2. An indicating check valve as claimed in claim 1, wherein the length of said reduced diameter cylindrical portion determines the extent of travel of said poppet valve away from said inlet port at the first predetermined fluid flow rate and the diameter thereof determines the extent of travel of said poppet valve toward said inlet port.

3. An indicating check valve as claimed in claim 1, including means for adjusting the position of said switch means relative to the position of said magnet.

4. An indicating check valve as claimed in claim 3, wherein said adjusting means includes a housing encasing said switch and said housing is threadedly attached to said valve body.

5. An indicating check valve as claimed in claim 3 or claim 4, wherein said switch means is a magnetically responsive reed switch.

* * * * *